United States Patent [19]

Katayama

[11] Patent Number: 5,052,656
[45] Date of Patent: Oct. 1, 1991

[54] FLOW CONTROL VALVE UNIT
[75] Inventor: Koji Katayama, Himeji, Japan
[73] Assignee: Mitsubishi Denki K.K., Tokyo, Japan
[21] Appl. No.: 519,989
[22] Filed: May 7, 1990
[30] Foreign Application Priority Data May 9, 1989 [JP] Japan .............................. 1-53575[U]

[51] Int. Cl.⁵ ............................................ F16K 31/04
[52] U.S. Cl. ................................ 251/129.11; 251/266; 251/368
[58] Field of Search ..................... 251/129.11, 266, 368

[56] References Cited

U.S. PATENT DOCUMENTS 4,592,534  6/1985  Ueda et al. ........................... 251/266
4,723,754  2/1988  Torimoto et al. ......... 251/129.11 X

FOREIGN PATENT DOCUMENTS 63-9609  1/1988  Japan .

Primary Examiner—Arnold Rosenthal
Attorney, Agent, or Firm—Sughrue, Mion, Zinn Macpeak & Seas

[57] ABSTRACT

A valve unit for controlling a fluid flow through a fluid passage (2) comprising a valve assembly (27) having a substantially cylindrical valve holder (43) axially movably mounted to a motor shaft (34,35) and a valve member (44) securely attached to the valve holder (43), and a conversion mechanism, including spiral splines (35,49) disposed between the motor shaft (34,35) and the valve holder (43) and an axial guide (24,42) disposed between the motor (26) and the valve holder (43), for converting a rotation of the motor shaft (30) into an axial translational movement of the valve assembly (27). The valve holder (43) and the valve member (44) are made of a resin and fastened together by a bayonet joint (45) and welding (46).

9 Claims, 3 Drawing Sheets

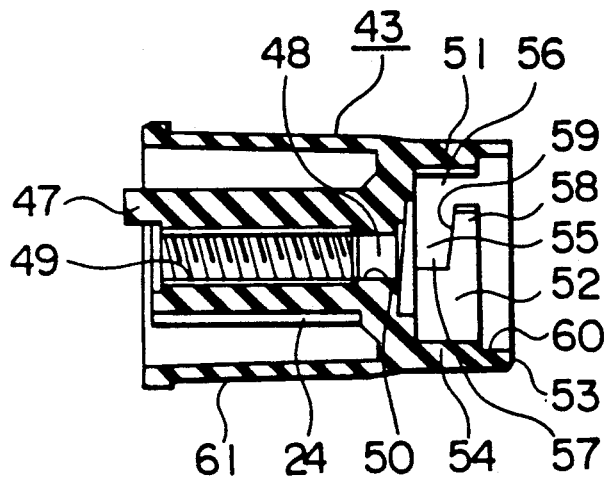
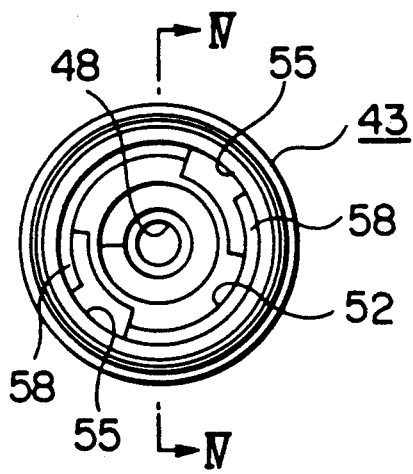
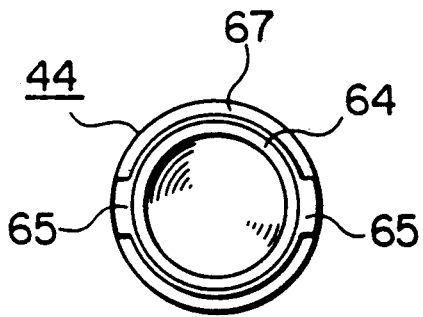
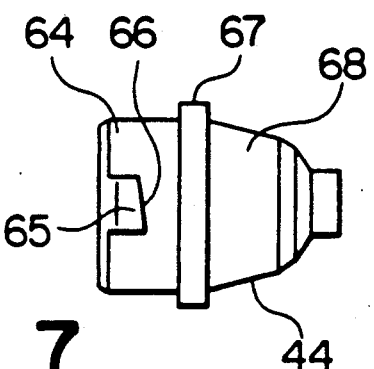
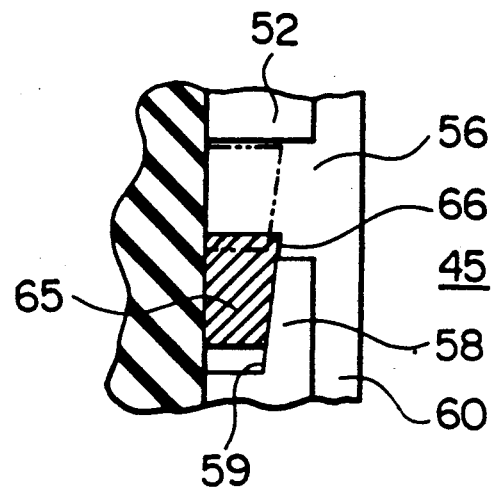

FLOW CONTROL VALVE UNIT

BACKGROUND OF THE INVENTION

This invention relates to a flow control valve unit and more particularly to a valve unit for controlling a fluid flow through a fluid passage in which the motor rotation is converted into a translational movement of a valve.

FIG. 1 illustrates in section a structure of a previously proposed flow control valve unit 1 for controlling a fluid flow flowing through a fluid passage 2 defined in a block member 3 to which the valve unit is mounted. The valve unit 1 comprises a motor 4 having a rotary shaft 5, and a valve assembly 6 having a substantially tubular valve holder 7 axially movably mounted to an extension of the motor shaft 5, a valve member 8 securely attached to the valve holder 7 by a thread therebetween and a splined mold member 9 insert-molded with the valve holder 7 so that they are integrally connected.

The flow control valve unit 1 also comprises a conversion mechanism disposed between the motor shaft 5 and the valve assembly 6 for converting a rotational movement of the motor shaft 5 into an axial translational movement of the valve assembly 6. The conversion mechanism includes spiral splines 11 formed on the extension of the motor shaft 5 and spiral splines 12 formed in an inner surface of the mold member 9 and engaged with the splines 11 on the motor shaft 5. The conversion mechanism also includes an axially extending stationary guide 13 disposed on a tubular member 14 attached to the motor 4 and a guide groove 15 formed in the mold member 9 of the valve assembly 6 for an axially slidable engagement with the stationary guide 13. A compression spring 16 is disposed between the valve holder 7 of the valve assembly 6 and the tubular member 14 for eliminating play between the spiral splines 11 and 12. The compression spring 16 is surrounded by a metallic tubular member 17 attached to the valve holder 7 of the valve assembly 6.

The valve assembly 6 is coaxially supported on the motor shaft 5 by a guide metal 18 disposed between the valve holder 7 and the extension of the motor shaft 5. In order to limit an axial movement of the valve assembly 6 within a suitable range, a first stopper 19 is disposed on the motor shaft 5 between the motor 4 and the valve assembly 6 and a second stopper 20 is mounted on a front end portion of the motor shaft 5.

When the motor 4 is energized in an open position illustrated in FIG. 1 in which the valve assembly 6 is separated from the valve seat 2a of the fluid passage 2, the motor shaft 5 rotates to drive the valve assembly 6 to move forward along the shaft 5 due to the conversion mechanism including the spiral splines 11 and 12 and the axial guide 13. When the valve member 8 of the valve assembly 6 engages the valve seat 2a of the fluid passage 2, the valve assembly 6 is in a closed position in which the fluid passage 2 is closed by the valve member 8. The flow rate of the fluid flowing through the fluid passage 2 can be adjusted to any desired point between 0% and 100% according to the rotation of the motor. The forward movement of the valve assembly 6 is limited by the second stopper 20 which abuts against the shoulder portion of the valve holder 7, and the rearward movement of the valve assembly 6 is limited by the first stopper 19 which engages the rear end of the mold member 9 of the assembly 6.

In the above-described flow control valve unit, the valve assembly 6 comprises a number of components. That is, the valve assembly 6 comprises the metallic valve holder 7 machined to the desired configuration, the mold member 9 having the internal thread or spline 12 to which the metallic valve holder 7 is insert-molded, and the metallic valve member 8 formed by machining and secured to the valve holder 7 through threads, so that the number of parts is large and the assembly of these parts by the insert-molding and the thread fastener is time-consuming and inaccurate. More particularly, since valve holder 7 is insert-molded into the splined mold member 9, the precise axial alignment of the valve holder 7 relative to the internal spline of the mold member 9 cannot be obtained. Also, since the valve holder 7 and the valve member 8 are made by machining, the deviation in the dimensions of the assembled valve holder 7 and the valve member 8 is large. Therefore, during the assembly of these components, the dimensional deviations of the manufacturing tolerance of each component may be accumulated, providing only poor positional accuracy between the valve member 8 and the valve seat 2a of the fluid conduit 2. While an arrangement is proposed in which an adjusting mechanism for adjusting the positional relationship between the valve holder 7 and the valve member 8 is disposed between the valve holder 7 and the valve member 8, this arrangement results in a further increase of the number of parts, a complicated structure, difficulty in manufacture and in a high cost.

SUMMARY OF THE INVENTION

Accordingly, one object of the present invention is to provide a valve unit free from the above-discussed problems of the above-described unit.

Another object of the present invention is to provide a valve unit which is simple in structure.

Another object of the present invention is to provide a valve unit which is small in the number of required parts and easy to assemble.

Still another object of the present invention is to provide a relatively inexpensive valve unit.

A further object of the present invention is to provide a valve unit which is structurally simple and reliable.

With the above objects in view, the valve unit for controlling a fluid flow through a fluid passage of the present invention comprises a motor having a rotary shaft and a valve assembly having a substantially cylindrical valve holder axially movably mounted to the motor shaft and a valve member securely attached to the valve holder. A conversion mechanism, including spiral splines is disposed between the motor shaft and the valve holder and a stationary guide disposed on the motor and the valve holder. The mechanism is for converting a rotation of the motor shaft into an axial translational movement of the valve assembly. The valve holder and the valve member are made of a resin.

In one embodiment, the valve holder and the valve member is secured together by heat welding. The valve holder and the valve member may be fastened together by a bayonet joint.

Preferably, one of the valve holder and the valve member comprises a tubular portion having an inner circumferential surface, a free end and a secured end at which the tubular portion is attached to the one of the valve holder and the valve member, the tubular portion having formed in the inner circumferential surface a cranked groove having an axial groove axially extending from the free end and a circumferential groove partially circumferentially extending from an inner end of the axial groove, and the other of the valve holder and the valve member comprises a cylindrical portion which can be received within the tubular portion of the one of the valve holder and the valve member, the cylindrical portion having a radial projection which can be passed through the axial groove and snugly fitted within the circumferential groove of the one of the valve holder and the valve member. The other of the valve holder or the valve member may comprise a flange engaging the free end of the tubular portion of the one of the valve holder and the valve member, and the flange of the other of the valve holder and the valve member and the free end of the tubular portion of the one of the valve holder and the valve member may be welded together.

BRIEF DESCRIPTION OF THE DRAWINGS

The present invention will become more readily apparent from the following detailed description of the preferred embodiment of the present invention taken in conjunction with the accompanying drawings, in which:

FIG. 3 is a rear view of the valve holder of the valve assembly shown in FIG. 2;

FIG. 4 is a sectional side view of the valve holder taken along line IV—IV of FIG. 3;

FIG. 5 is a side view of the valve member of the valve assembly illustrated in FIG. 2;

FIG. 6 is a rear view of the valve member illustrated in FIG. 5; and

FIG. 7 is a fragmentary enlarged view of the bayonet joint for connecting the valve member and the valve holder.

DESCRIPTION OF THE PREFERRED EMBODIMENT

Figure 2:
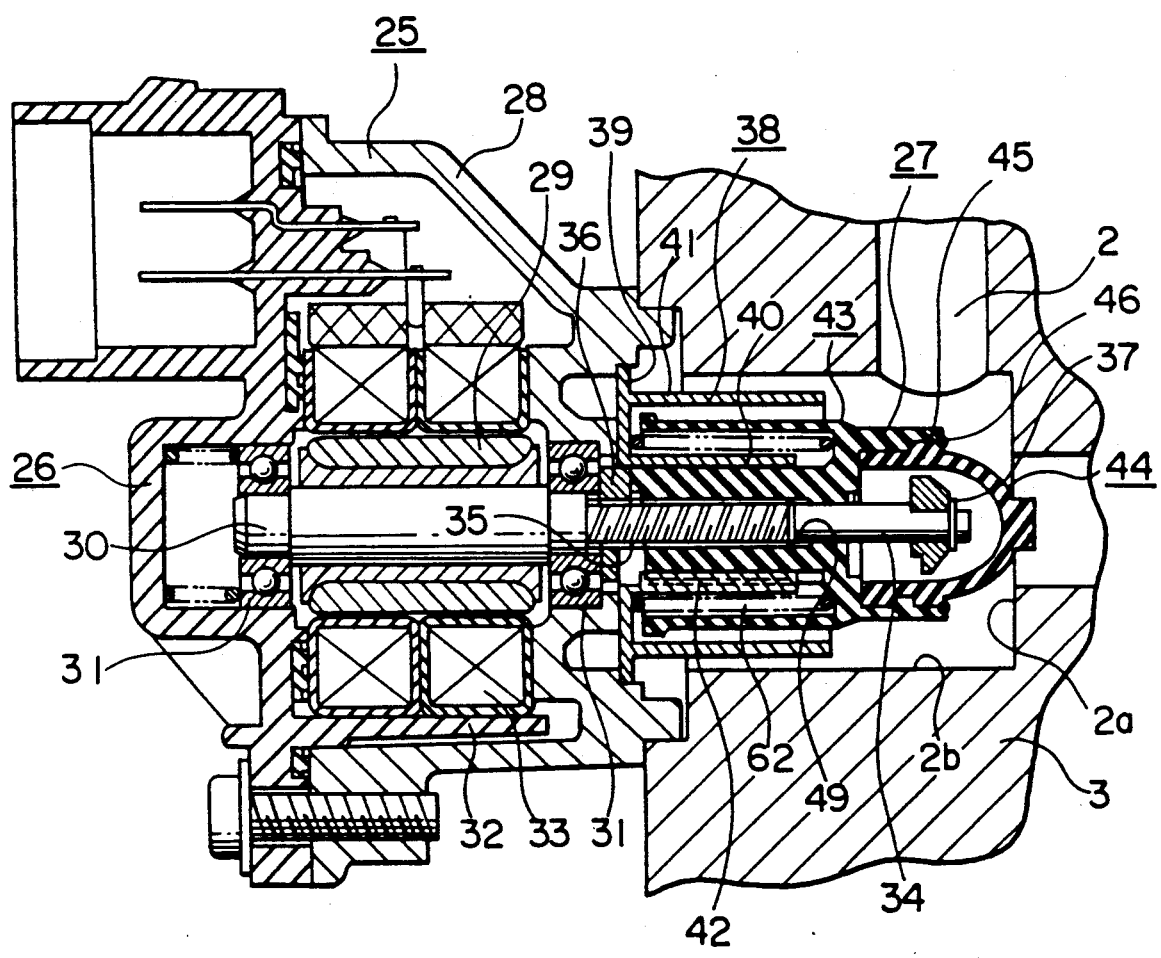
FIG. 2 is a sectional side view of a flow rate control valve unit of the present invention.

FIG. 2 illustrates a fluid flow rate control valve unit 25 of the present invention together with a block member 3 defining therein a fluid passage 2 including a valve seat 2a and a cavity 2b. The valve unit 25 of the present invention comprises a motor 26 and a valve assembly 27 mounted on and driven by motor 26.

The motor 26 comprises a housing 28 securely mounted to the fluid conduit block member 3, a rotor 29 including a rotary shaft 30 and rotatably supported by the housing 28 through a pair of bearings 31, and a stator 32 including a stator coil 33 disposed within the housing 28 around the rotor 29. The rotary shaft 30 has an integral extension 34 having formed therein a thread or a spiral spline 35, a stopper ring 36 at the root of the extension 34 and a stopper 37 on the free end of the extension 34.

The valve unit 25 also includes a stationary guide 38 securely mounted to the motor housing 28. The stationary guide 38 is a substantially tubular member having an annular disc plate 39 attached to the housing 28, an inner tube 40 extending from an inner edge of the annular disc plate 39 in a coaxial relationship relative to the shaft extension 34 and an outer tube 41 coaxially extending from the annular disc plate 39 and defining an annulus between the inner and the outer tubes 40 and 41. The stationary guide 38 futher includes an axially-extending guide projection 42 radially inwardly projecting from an inner circumferential surface of the inner tube 40. The guide projection 42 extends through a substantially entire length of the inner tube 40.

The valve assembly 27 of the valve unit 25 comprises a substantially cylindrical valve holder 43 axially movably mounted on the shaft extension 34 of the motor shaft 30 and a valve member 44 securely attached to the valve holder 43 by a bayonet joint 45 and by welding 46. The valve holder 43 and the valve member 44 are made of resin material that can be welded together.

As best shown in FIGS. 3 and 4, the valve holder 43 comprises a cylindrical main body 47 having a central bore 48 with a internal thread or splines 49 which is in engagement with the splines 35 of the shaft extension 34 so that the valve holder 43 is slidable and rotatable relative to the shaft extension 34. The main body 47 has a rear end which, when assembled, is inserted into the inner tube 40 of the stationary guide 38 and which abuts the first stopper 36. The main body 47 also has a keyway-shaped axial groove 24 in the outer circumferential surface thereof. The main body 47 has a front end having an inner circumferential surface 50 supporting the shaft extension 34 and having connected thereto a large-diameter tubular portion 51.

The tubular portion 51 has an inner circumferential surface 52, a free end 53 and a secured end 54 at which the tubular portion 51 is attached to the main body 47 of the valve holder 43. The tubular portion 51 has formed in the inner circumferential surface 52 a cranked groove 55 which constitutes the bayonet joint 45 (FIG. 2). The cranked groove 55 includes an axial groove 56 axially extending from the free end 53 and a circumferential groove 57 partially circumferentially extending from an inner end of the axial groove 56. It is seen that the cranked groove 55 is defined by a circumferentially extending land portion 58 having an inner side wall 59 tapered toward the tip of the land portion 58. The free end 53 of the tubular portion 51 has a large-diameter inner circumferential surface 60.

Extending rearwardly from the rear end 54 of the tubular portion 51 at which it is connected to the main body 47 is an integral tubular cover 61 which, in the assembled state, extends into the annular space defined between the inner and the outer tubes 40 and 41 of the stationary guide 38. It is seen in FIG. 2 that a compression spring 62 is disposed within the cover 61 between the annular plate 39 and a shoulder portion of the valve holder 43 in order to absorb any play between the outer and the inner splines 49 and 35 (FIG. 2).

The valve member 44, as best illustrated in FIGS. 5 and 6, is a generally cup-shaped member which comprises a cylindrical wall portion 64 which can be inserted into the tubular portion 51 of the valve holder 43 as illustrated in FIG. 2. The cylindrical wall portion 64 has a pair of radial projections 65 radially outwardly extending at diametrically opposed positions at the open end of the cylindrical wall portion 64. The projections 65 each can be passed through the axial groove 56 and can be snugly fitted within the circumferential groove 57 of the cranked groove 55 of the valve holder 43 by turning the valve member 44 relative to the valve holder 43. The projection 65 has a slanted side wall 66 which fits on the tapered side wall 59 of the land portion 58 of the valve holder 43 as best seen from FIG. 7. The valve member 44 also comprises a flange 67 on the outer circumference of the cylindrical wall portion 64. The flange 67 is disposed at an interface between the cylindrical wall portion 64 and a cap wall portion 68 and is received by the circumferential groove 60 at the free end 53 of the tubular portion 52 of the valve holder 43 when the valve member 44 is assembled into the valve holder 43 as illustrated in FIG. 2, in which it is seen that the front side face of the flange 67 of the valve member 44 and the front end face of the free end 53 of the tubular portion 51 of the valve holder 43 are flush with each other and are welded as by weld 46.

As illustrated in FIG. 2, the valve assembly 27 is thread-engaged with the rotary shaft 30 of the motor 26 through a conversion mechanism for converting a rotation of the motor shaft 34 into an axial translational movement of the valve assembly 27. In the illustrated embodiment, the conversion mechanism comprises the spiral splines 35 formed on the motor shaft extension 34, the spiral splines 49 formed on the inner surface 50 of the valve holder 43 and thread-engaged with the spiral splines 35, the guide rail 42 of the stationary guide 38 mounted to the housing 28 of the motor 26 and the guide groove 24 along which the guide rail 42 is slidably movable.

During assembly, the valve holder 43 is thread-engaged onto the threaded shaft extension 34 against the action of the compression spring 62. The valve holder 43 may be moved forwardly until the rear end of the main body 47 of the valve holder 43 abuts against the stopper 36. Then, the second stopper 37 is secured on the tip of the shaft extension 34, so that the forward and rearward positions of the valve holder 43 may be limited. Finally, the valve member 44 is secured to the valve holder 43 by the bayonet joint 45 wherein, as illustrated in FIG. 7, the projections 65 of the valve member 44 are first passed through the axial grooves 56 and then turned about its axis so that the projections 65 circumferentially move along the circumferential grooves 57 of the cranked grooves 55 until they are frictionally held in the grooves 55 by the wedge-function of the tapered side surfaces 59 and 66. If it is desired, the bayonet joint may be replaced with a thread connection. In the illustrated embodiment, the valve holder 43 and the valve member 44 are additionally secured by the weld 46 in order to prevent their bayonet connection from becoming loose.

Figure 1:
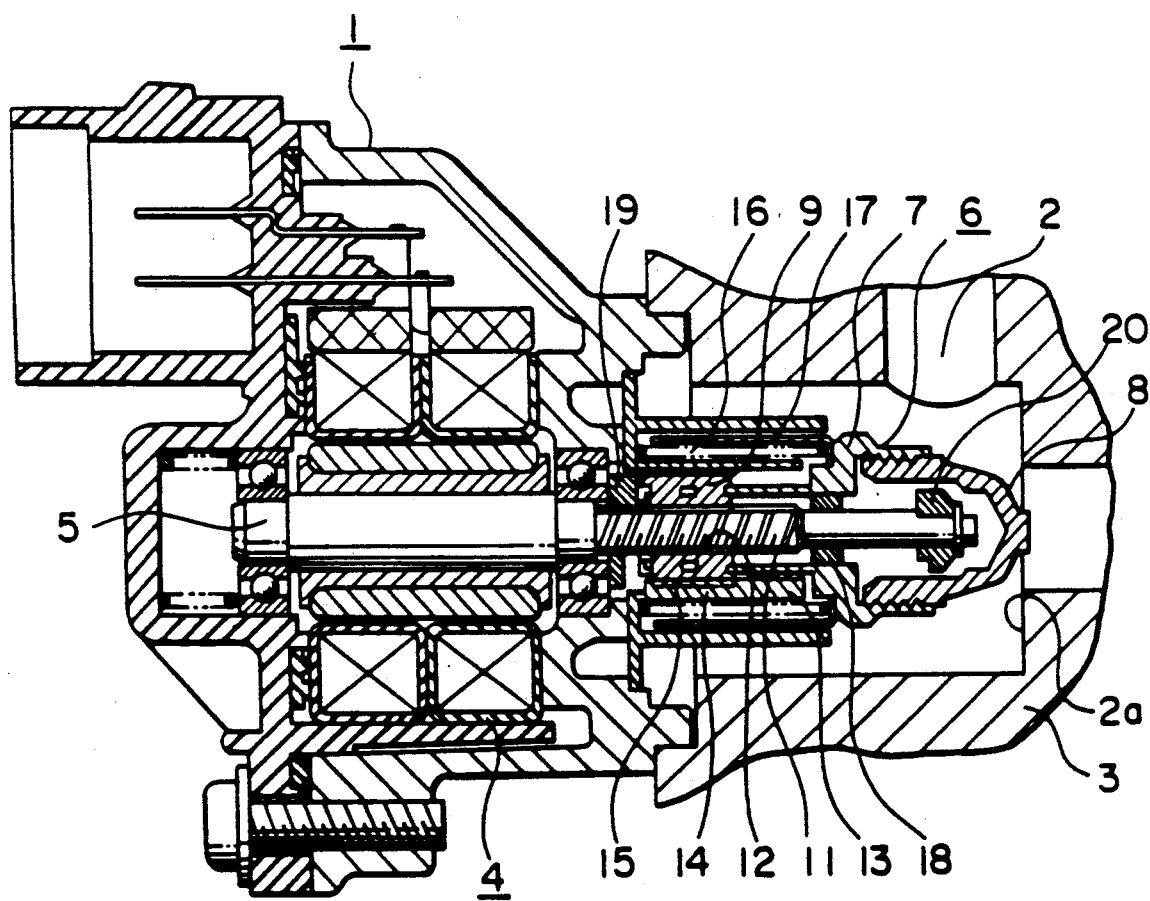
FIG. 1 is a sectional side view of a previously proposed flow rate control valve unit.

The operation of the valve unit 25 is similar to that of the conventional valve unit 1 described and illustrated in connection with FIG. 1, so that the operation of the valve unit 25 of the present invention is omitted.

As has been described, since the valve holder 43 and the valve member 44 are made of a resin and the components can be integrally made by molding, the dimensional errors can be substantially completely eliminated by the fine adjustment of the mold dies used. Therefore, the need for the fine adjustments of the components during the assembly is substantially eliminated. Also, the number of the components needed in the conventional design is significantly decreased and structure is simple, so that the need for the adjusting mechanism and the additional manufacturing steps is eliminated, whereby the valve unit of the present invention can be relatively inexpensive and reliable.

What is claimed is:

1. A valve unit for controlling a fluid flow through a fluid passage, comprising:
    a motor having a rotary shaft;
    a valve assembly having a substantially cylindrical valve holder axially movably mounted to said rotary shaft and a valve member securely attached to said valve holder; and
    conversion means, including spiral splines disposed between said rotary shaft and said valve holder and a stationary guide disposed on said motor and said valve holder, for converting a rotation of said rotary shaft into an axial translational movement of said valve assembly;
    said valve holder and said valve member being made of a resin and being welded together.

2. A valve unit for controlling a fluid flow through a fluid passage, comprising:
    a motor having a rotary shaft;
    a valve assembly having a substantially cylindrical valve holder axially movably mounted to said rotary shaft and a valve member securely attached to said valve holder; and
    conversion means, including spiral splines disposed between said rotary shaft and said valve holder and a stationary guide disposed on said motor and said valve holder, for converting a rotation of said rotary shaft into an axial translational movement of said valve assembly;
    said valve holder and said valve member being made of a resin, and wherein said valve holder and said valve member are secured together by heat welding.

3. A valve unit as claimed in claim 1, wherein said valve assembly is driven by said motor to a position between a closed position in which said fluid passage is closed by said valve member and an open position in which said fluid passage is fully opened according to the rotation of said motor to regulate the fluid flow rate.

4. A valve unit as claimed in claim 1, wherein said valve holder has an internal spiral spline engageable with said spiral spline of said rotary shaft and a guided member engaged with said guide member, said valve holder being mounted on said rotary shaft with said splines as well as with said guide and guided members engaged with each other, respectively, for an axial translational movement of said valve holder according to the rotation of said motor.

5. A valve unit for controlling a fluid flow through a fluid passage, comprising:
    a motor having a rotary shaft;
    a valve assembly having a substantially cylindrical valve holder axially movably mounted to said rotary shaft and a valve member securely attached to said valve holder; and
    conversion means, including spiral splines disposed between said rotary shaft and said valve holder and a stationary guide disposed on said motor and said valve holder, for converting a rotation of said rotary shaft into an axial translational movement of said valve assembly;
    said valve holder and said valve member being made of a resin, and wherein said valve holder and said valve member are fastened together by a bayonet joint.

6. A valve unit as claimed in claim 5, wherein said valve holder and said valve member are welded.

7. A valve unit for controlling a fluid flow through a fluid passage, comprising:
    a motor having a rotary shaft;
    a valve assembly having a substantially cylindrical valve holder axially movably mounted to said rotary shaft and a valve member securely attached to said valve holder; and conversion means, including spiral splines disposed between said rotary shaft and said valve holder and a stationary guide disposed on said motor and said valve holder, for converting a rotation of said rotary shaft into an axial translational movement of said valve assembly;

said valve holder and said valve member being made of a resin, and wherein one of said valve holder and said valve member comprises a tubular portion having an inner circumferential surface, a free end and a secured end at which said tubular portion is attached to said one of said valve holder and said valve member, said tubular portion having formed in said inner circumferential surface a cranked groove having an axial groove, axially extending from said free end, and a circumferential groove, partially circumferentially extending from an inner end of said axial groove, and the other of said valve holder and said valve member comprises a cylindrical portion which is received within said tubular portion of said one of said valve holder and said valve member, said cylindrical portion having a radial projection which is passed through said axial groove and snugly fitted within said circumferential groove of said one of said valve holder and said valve member.

8. A valve unit as claimed in claim 7, wherein said other of said valve holder and said valve member comprises a flange engaging said free end of said tubular portion of said one of said valve holder and said valve member.

9. A valve unit as claimed in claim 8, wherein said flange of said other of said valve holder and said valve member and said free end of said tubular portion of said one of said valve holder and said valve member are welded.

* * * * *